(12) United States Patent
Bell et al.

(10) Patent No.: US 8,092,187 B2
(45) Date of Patent: Jan. 10, 2012

(54) FLATBACK INSERT FOR TURBINE BLADES

(75) Inventors: Eric Bell, Greenville, SC (US);
Matthew Gann, Greenville, SC (US);
Jamie Livingston, Simpsonville, SC (US); Mohamad Sultan, Simpsonville, SC (US); Alan Walker, Greenville, SC (US)

(73) Assignee: General Electric Company, Schenedtady, NY (US)

( * ) Notice: Subject to any disclaimer, the term of this patent is extended or adjusted under 35 U.S.C. 154(b) by 152 days.

(21) Appl. No.: 12/345,738

(22) Filed: Dec. 30, 2008

(65) Prior Publication Data

US 2010/0143146 A1    Jun. 10, 2010

(51) Int. Cl.
*F01D 5/14*    (2006.01)
(52) U.S. Cl. ............... 416/224; 416/229 R; 416/230; 416/233; 29/889.7; 29/889.71
(58) Field of Classification Search ............... 416/60, 416/223 R, 224, 229 R, 230, 232, 233, 248; 29/889.21, 889.7, 889.71, 889.72
See application file for complete search history.

(56) References Cited

U.S. PATENT DOCUMENTS

| | | | |
|---|---|---|---|
| 3,217,807 A * | 11/1965 | Underhill, Jr. et al. | 416/226 |
| 4,643,646 A * | 2/1987 | Hahn et al. | 416/226 |
| 7,473,385 B2 * | 1/2009 | Stiesdal et al. | 264/314 |
| 7,637,721 B2 * | 12/2009 | Driver et al. | 416/224 |
| 2010/0028161 A1 * | 2/2010 | Vronsky et al. | 416/238 |
| 2010/0028162 A1 * | 2/2010 | Vronsky et al. | 416/241 R |
| 2010/0127504 A1 * | 5/2010 | Hancock | 290/55 |
| 2010/0296940 A1 * | 11/2010 | Zuteck | 416/226 |

FOREIGN PATENT DOCUMENTS

EP    37987 A2 * 10/1981

* cited by examiner

*Primary Examiner* — Edward Look
*Assistant Examiner* — Ryan Ellis
(74) *Attorney, Agent, or Firm* — McNees Wallace & Nurick (57) ABSTRACT

A blade for the use in the generation of power has a leading edge and a trailing edge. A first shell portion of the blade extends from the leading edge to the trailing edge. A second shell portion of the blade also extends from the leading edge to the trailing edge. A root portion of the blade is positioned proximate the wind turbine and a tip portion which extends from the root portion away from the wind turbine. A trailing edge insert is positioned between the first shell portion and the second shell portion proximate the root portion. The trailing edge insert has a surface which extends between and separates the first shell portion from the second shell portion at the trailing edge, such that the insert provides a high lift profile for increased blade efficiency.

18 Claims, 6 Drawing Sheets

FLATBACK INSERT FOR TURBINE BLADES

FIELD

The present disclosure is generally directed to flatback airfoils and more particularly relates to the use of a trailing edge insert which provides greater blade efficiency and increased energy capture.

BACKGROUND

Wind power and the use of wind turbines have gained increased attention as the quest for alternative energy sources continues. Wind power may be considered one of the cleanest, most environmentally friendly energy sources presently available. Different from traditional fossil fuel sources, wind power is completely renewable and does not produce noxious or environmentally harmful bi-products. With an increasing attention towards generating more energy from wind power, technological advances in the art have allowed for increased sizes of wind turbines and new designs of wind turbine components. However, as the physical sizes and availability of wind turbines increase, so does the need to balance the cost of manufacturing and operating wind turbines to further allow wind power to be cost-competitive with other energy sources.

A modern wind turbine typically includes a tower, generator, a gearbox, a nacelle, and one or more rotor blades. The rotor blades capture the kinetic energy of wind using foil principles known in the art. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The size, shape, and weight of rotor blades are factors that contribute to energy efficiencies of wind turbines. For example, an increase in rotor blade size increases the energy production of a wind turbine, while a decrease in weight also furthers the efficiency of a wind turbine. Furthermore, as rotor blade sizes grow, extra attention needs to be given to the structural integrity of the rotor blades. Presently, large commercial wind turbines are capable of generating between one and one-half megawatts to five megawatts of power. Some of the larger wind turbines have rotor blade swept areas larger than 90 meters in diameter. Additionally, advances in rotor blade shape encourage the manufacture of a swept-shaped rotor blade having a general arcuate contour from the base to the tip of the blade, providing improved aerodynamics. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

In order to achieve higher performing blades with increased annual energy production, "flatback" airfoils have been tested and used for the inboard section of the blade. Compared to thick conventional, sharp trailing-edge airfoils, a flatback airfoil with the same thickness exhibits increased lift and reduced sensitivity to fouling. These previous designs have incorporated the flatback concept into the skin, by opening up the trailing edge of the airfoil uniformly along the camber line. While offering improved performance, the structure of these previous designs is not reliable in all circumstances.

It would, therefore, be beneficial to provide a structural flatback airfoil insert which provides aerodynamic performance and significant energy capture capability. It would also be beneficial to provide a structural flatback airfoil which adds to the stability of the blade and which may replace other structural members such as the auxiliary shear webs.

SUMMARY

One aspect of the present disclosure is directed to a blade for use with a wind turbine. The blade has a leading edge and a trailing edge. A first shell portion of the blade extends from the leading edge to the trailing edge. A second shell portion of the blade also extends from the leading edge to the trailing edge. A root portion of the blade is positioned proximate the wind turbine and a tip portion which extends from the root portion away from the wind turbine. A trailing edge insert is positioned between the first shell portion and the second shell portion proximate the root portion. The trailing edge insert has a surface which extends between and separates the first shell portion from the second shell portion at the trailing edge, such that the insert provides a high lift profile for increased blade efficiency.

In another aspect of the disclosure a blade for use in the generation of power is disclosed. The blade has a leading edge and a trailing edge. A first shell portion of the blade extends from the leading edge to the trailing edge. A second shell portion of the blade also extends from the leading edge to the trailing edge. An insert having a stiffening core disposed between layers of fiber fabric is positioned between the first shell portion and the second shell portion proximate the trailing edge of the blade. An outside surface of the insert extends between and separates the first shell portion from the second shell portion at the trailing edge. The insert provides structural stability to the trailing edge and a high lift profile for increased blade efficiency.

In another aspect of the disclosure a blade for use in the generation of power is disclosed. The blade has a leading edge and a trailing edge. A first shell portion of the blade extends from the leading edge to the trailing edge. A second shell portion of the blade also extends from the leading edge to the trailing edge. An insert having a stiffening core disposed between layers of fiber fabric is positioned between the first shell portion and the second shell portion proximate the trailing edge of the blade. An outside surface of the insert extends between and separates the first shell portion from the second shell portion at the trailing edge. Securing members are attached to the first shell portion and the insert to provide stability for loads which are out of the plane of the insert. The insert provides structural stability to the trailing edge and a high lift profile for increased blade efficiency.

This flatback configuration disclosed is a high lift aerodynamic design that allows for greater blade efficiency by utilizing short chord length and thick chord profiles. As blade performance requirements are driven higher, this flatback configuration offers increased performance especially near the root region in a lower weight package. This allows for increased energy capture in the root region.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
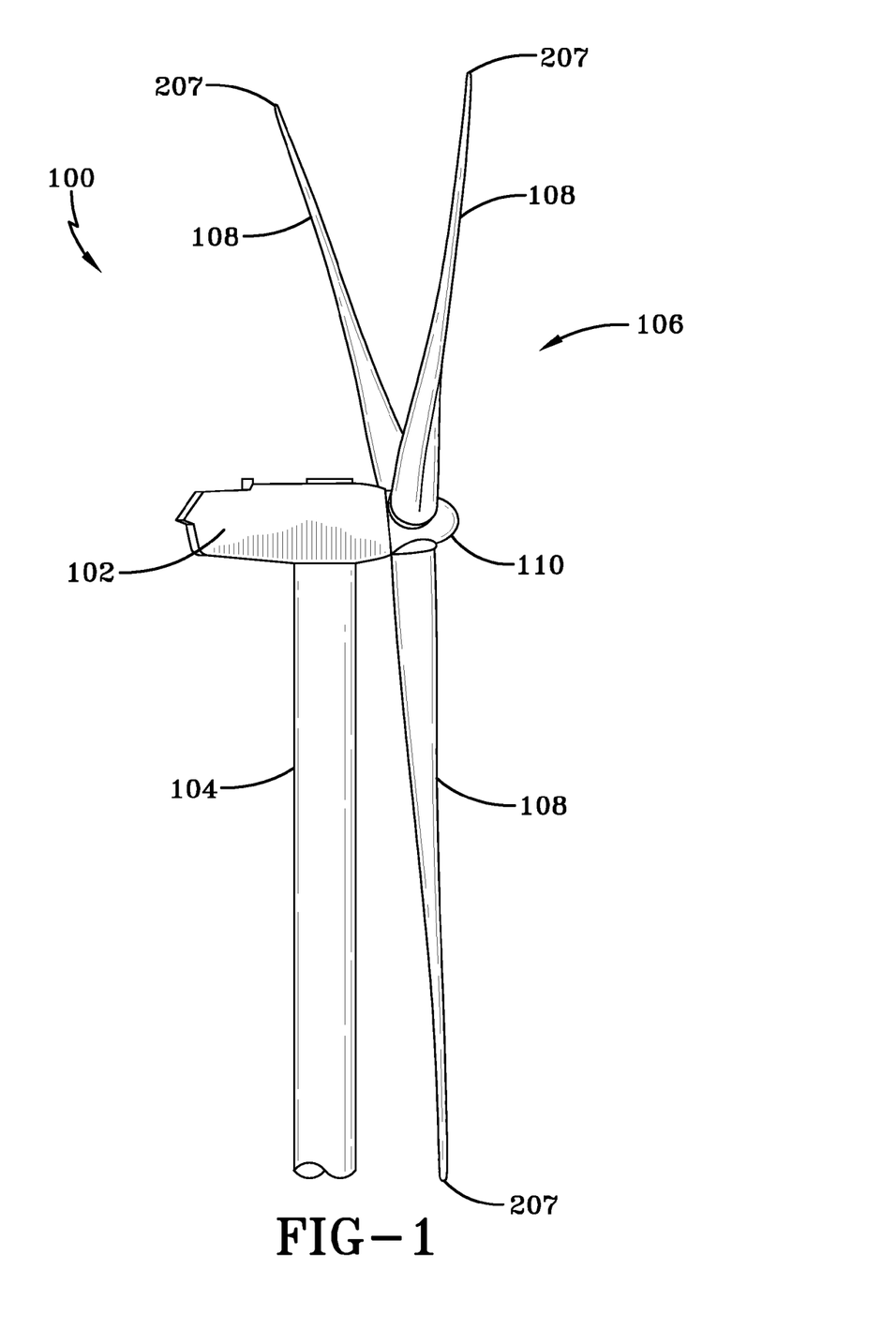
FIG. 1 is an illustration of an exemplary configuration of a wind turbine.

Referring to FIG. 1, an exemplary wind turbine 100 is disclosed. The wind turbine 100 includes a nacelle 102 mounted atop a tall tower 104, only a portion of which is shown in FIG. 1. Wind turbine 100 also comprises a wind turbine rotor 106 that includes one or more rotor blades 108 attached to a rotating hub 110. Although wind turbine 100 illustrated in FIG. 1 includes three rotor blades 108, there are no specific limits on the number of rotor blades 108 that can be used. The height of tower 104 is selected based upon factors and conditions known in the art.

Figure 2:
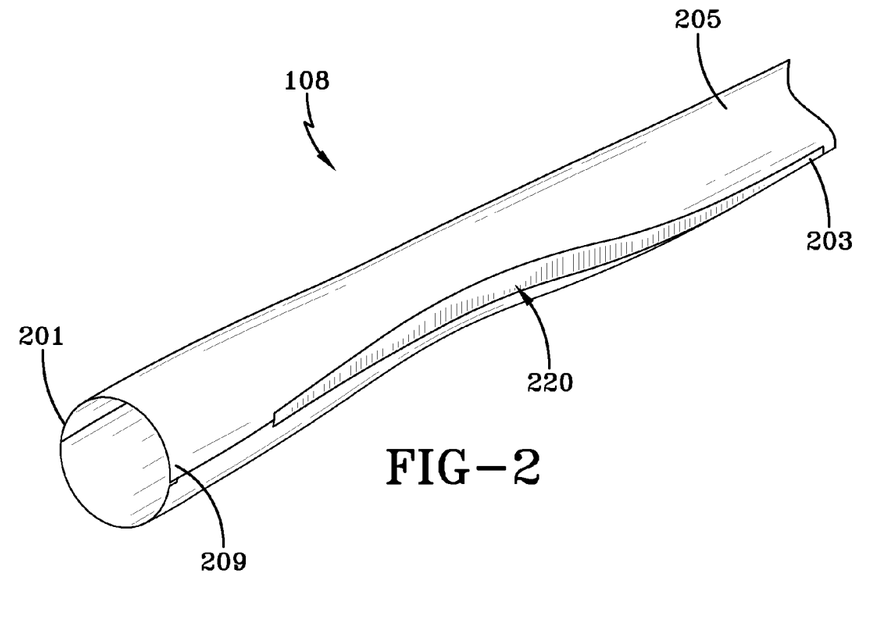
FIG. 2 is an illustration of a portion of a blade with a trailing edge insert of the exemplary wind turbine configuration shown in FIG. 1.

As shown in FIG. 2, each turbine blade 108 has a leading edge 201 and a trailing edge 203. The turbine blade 108 includes an airfoil portion 205 extending from the tip 207 (FIG. 1) to the root 209, which is connectable to the hub 110 of the wind turbine. A trailing edge insert 220 is provided at the trailing edge 203 proximate the transition between the airfoil portion 205 and the root 209. The trailing edge insert 220 is a "flatback" profile which provides high lift aerodynamics that allow for greater blade efficiency by utilizing short chord lengths and thick chord profiles for the blade 108. While the use of the trailing edges insert 220 is described for use with the wind turbine blade 108, the trailing edge insert may be used in other blade configurations and for blades which operate in other environments, such as fluids.

Figure 4:
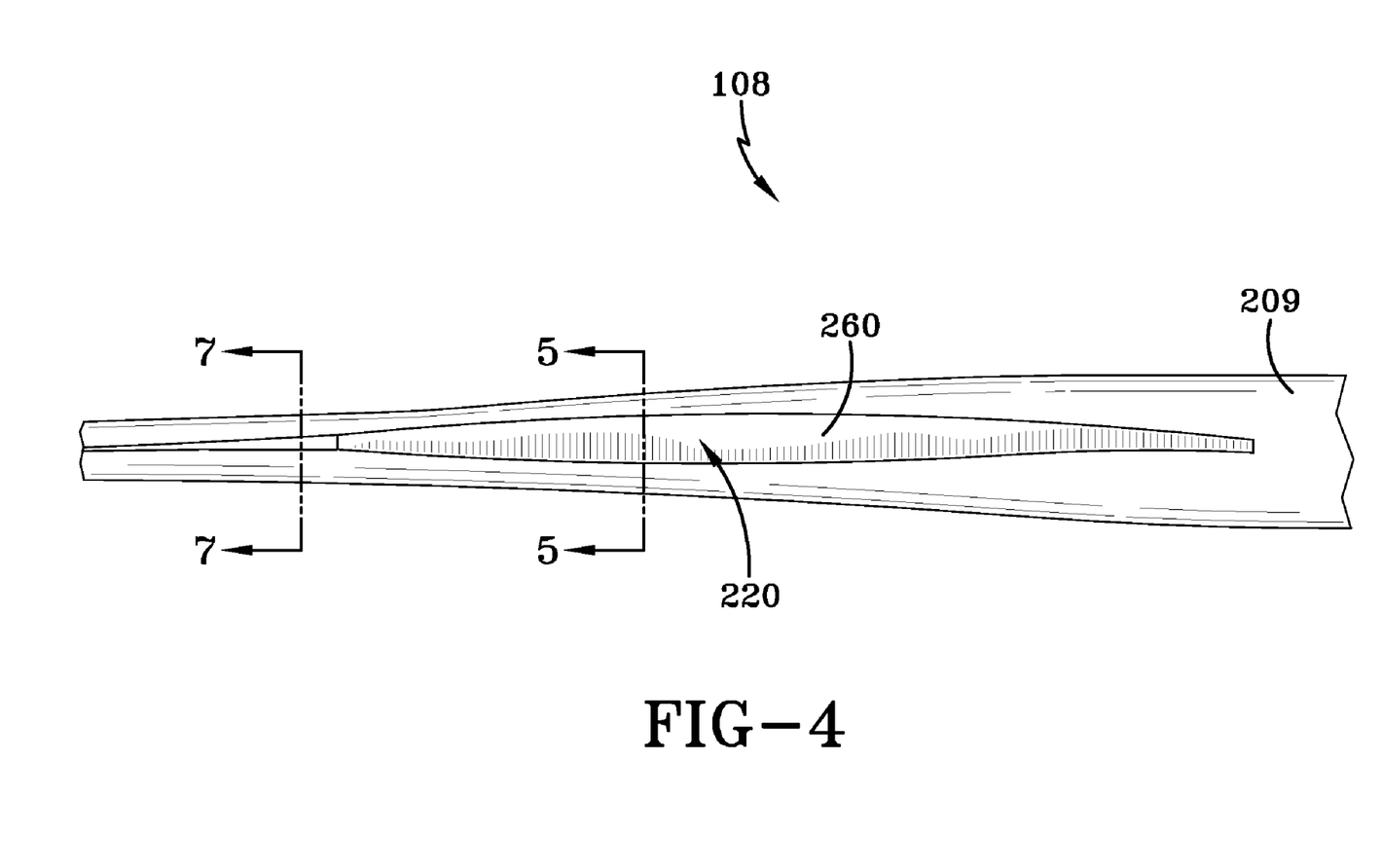
FIG. 4 is a back plan view of the portion of the blade shown in FIG. 3.
Figure 5:
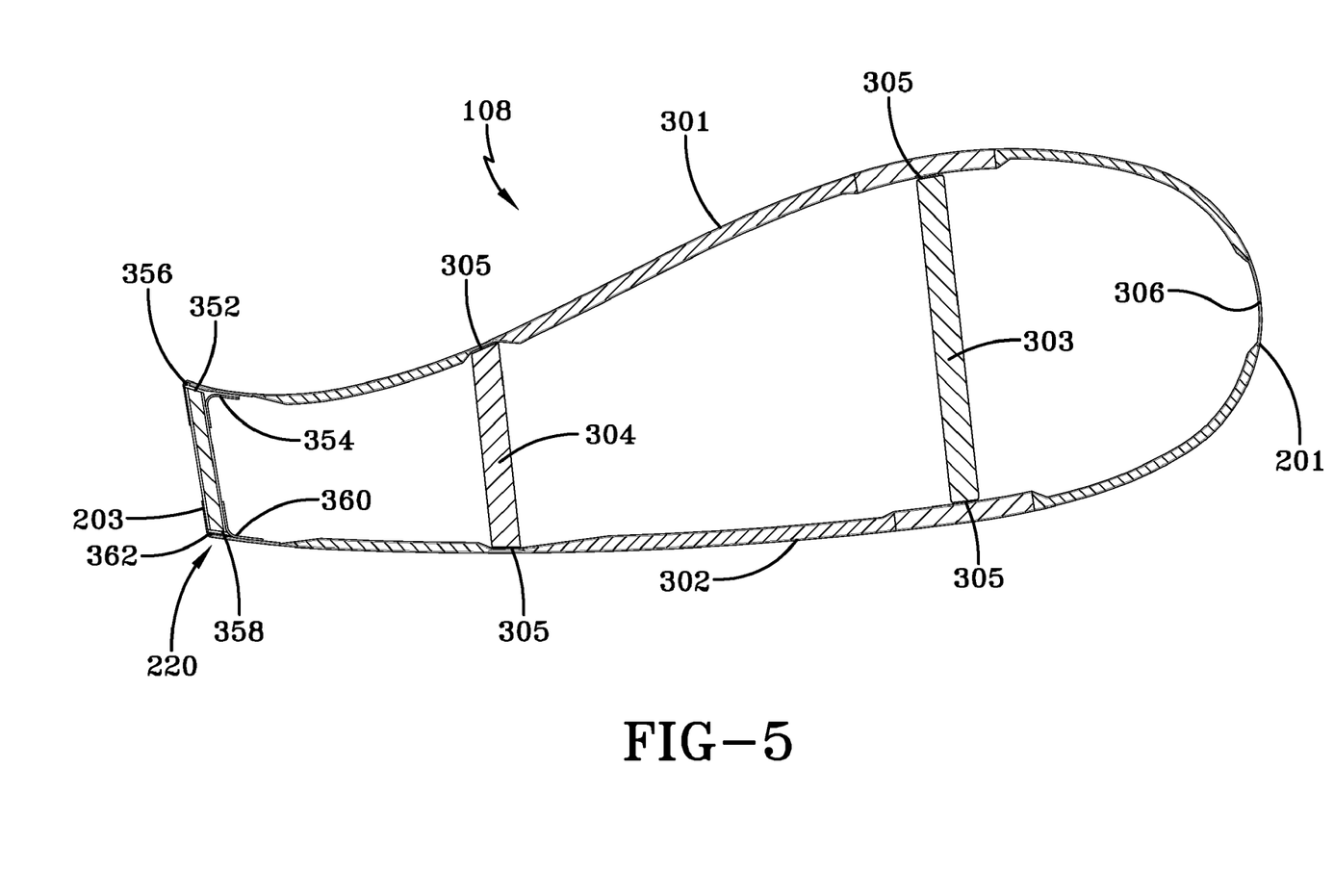
FIG. 5 is an enlarged cross-sectional view of the blade taken along line 5-5 of FIG. 4.

FIG. 5 is a cross-section of a wind turbine blade taken along line 5-5 of FIG. 4. The wind turbine blade 108 includes a first shell portion 301 and a second shell portion 302, which are each adhesively bonded to a first shear web 303 and a second shear web or auxiliary shear web 304. The joints between the first shell portion 301 and the shear webs 303, 304 include an adhesive joint 305. In addition, an additional adhesive joint 305 is placed between the shear webs 303, 304 and the second shell portion 302. The first shell portion 301 is also adhered to the second shell portion 302 by an adhesive joint 306 adjacent the leading edge 201. The wind turbine blade of FIG. 5 includes the prefabricated shear webs 303, 304 which are formed, infused and cured prior to bringing into contact with the first shell portion 301 and the second shell portion 302. Other types of shear webs and joining adhesives are known in the prior art and can be used herein without departing from the scope of the invention. The geometry of the cross-section of the turbine blade 108 is not limited to the cross-section shown and may include any suitable cross-section that is operable as a wind turbine blade 108. In addition, the number, configuration and placement of the shear web portions 303, 304 are not limited to that shown and may include any other embodiments in which the wind turbine blade 108 structure is maintained. In addition, a spar cap or other reinforcing structure may also be incorporated into or integrated in the first shell portion 301 and/or the second shell portion 302.

Figure 3:
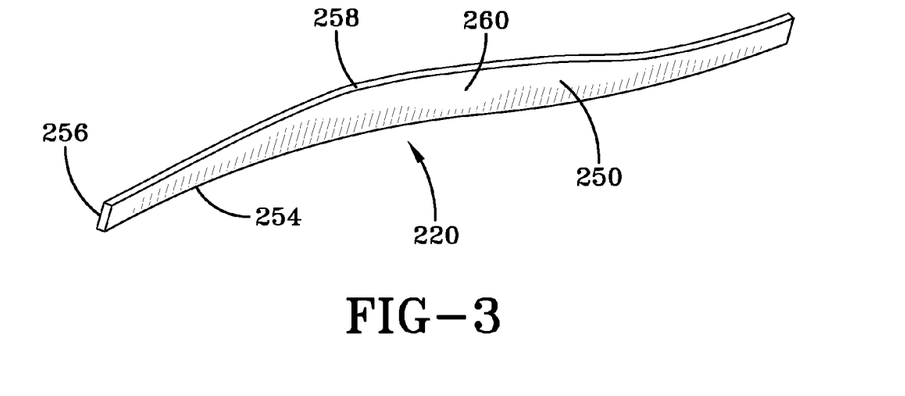
FIG. 3 is a perspective view of the trailing edge insert of FIG. 2.

Referring to FIGS. 2 through 7, the trailing edge insert 220 includes a stiffening core 250 (see e.g. FIG. 6) made from materials such as balsa wood or foam which has been molded, shaped or formed into the desired configuration. The stiffening core is disposed intermediate layers of fiber fabric 252 (see e.g. FIG. 6). The fabric 252 is of the type described below and may be reinforced with thermosetting or thermoplastic material to provide additional strength and stability. The stiffening core 250 and the intermediate layers of fiber fabric 252 are formed using any suitable composite forming method. Suitable methods include, but are not limited to, resin transfer molding (RTM), vacuum assisted resin transfer molding (VARTM), resin infusion method (RIM) or any other suitable resin infusion method for forming fiber reinforced composites. The trailing edge insert 220 has an inside surface 256 and a generally opposed facing outside surface 260. A first sidewall 254 and a second sidewall 258 extend between the inside surface 256 and the outside surface 260. Depending upon the final configuration of the blade 108 desired, the first and second sidewalls may be perpendicular to the inside and outside surfaces 256, 260 or may be positioned at another angle relative thereto. As best shown in FIGS. 2 through 4, the trailing edge insert 220 is formed to conform to the shape of the trailing edge 203 of each first and second shell portion 301, 302 and the blade 108. The use of the balsa wood or foam, or other such material, allows the trailing edge 220 to be molded, shaped or formed in the complex shape needed to conform to the non-linear configuration of the trailing edge 203 while still providing the structural integrity required to withstand the significant forces applied to the trailing edge 203 as the turbine 100 is operated.

Figure 6:
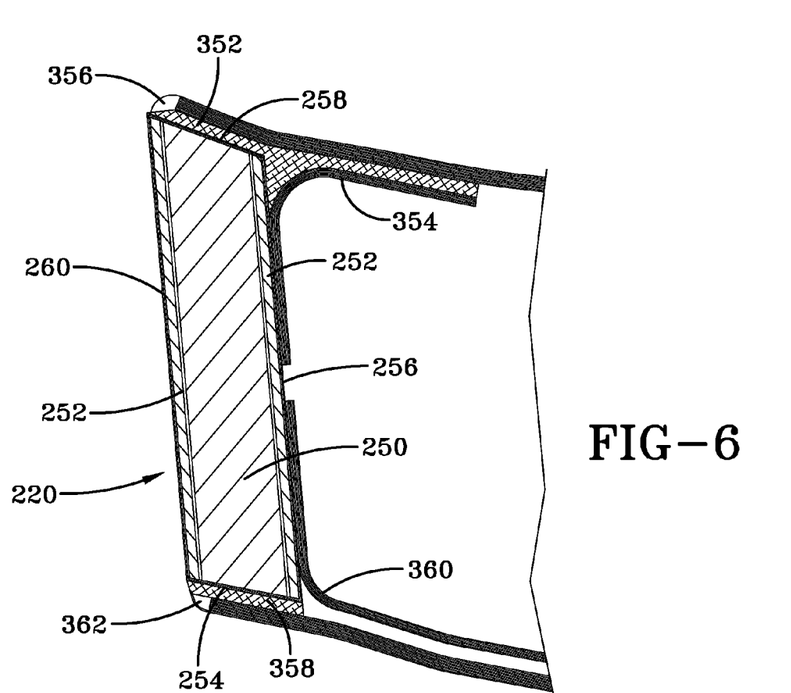
FIG. 6 is an enlarged cross-sectional view of the portion of the trailing edge insert of FIG. 5.

Referring to FIGS. 5 and 6, the trailing edge insert 220 is mounted to the second shell portion 302 by periodically spaced adhesive joints 358 (best shown in FIG. 7), wet bond shear clips 360 and outside corner mounting members 362. The trailing edge insert 220 is mounted to the first shell portion 301 by periodically spaced adhesive joints 352, preformed shear clips 354 and outside corner mounting members 356. Adhesive joints 352, 358 are formed between surfaces via contact with adhesive compositions or other materials known in the art for joining composite materials. Suitable adhesive compositions include, but are not limited to, epoxy, polyester, methylacrylate, vinylester or other adhesive resin.

Figure 7:
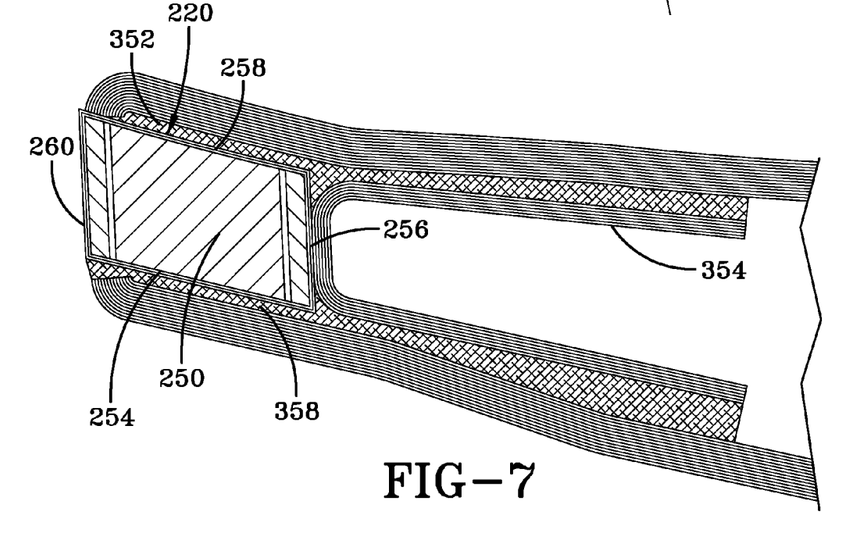
FIG. 7 is an enlarged cross-sectional view of the portion of the trailing edge insert taken along line 7-7 of FIG. 4.

The wet bond shear clips 360 and the preformed shear clips 354 provide stability to the trailing edge and provide increased shear transfer when loads are applied to the first and second shell portions 303, 304. The wet bond shear clips 360, the preformed shear clips 354, and the outside corner mounting members 356, 362 provide for the transfer of loads applied out of the plane of the trailing edge. Consequently, the wet bond shear clips 360, the preformed shear clips 354, and the outside corner mounting members 356, 361, in different combinations, depending on where the load is applied, protect the trailing edge insert 220 and the first and second shell portions 303, 304 from shear forces and bending moments.

The wet bond shear clips 360 are made from reinforcing fabric. The reinforcing fabric may be provided in any form suitable for providing the strength characteristics required, including uniaxial, biaxial, triaxial or quadaxial weaves, braids, chopped strands, rovings or discontinuous fiber mats. Fibers suitable for reinforcement fabric include glass, carbon fiber, synthetic fibers, such as KEVLAR®, or other lightweight reinforcing fibers. KEVLAR® is a federally registered trademark of E.I. DuPont de Nemours & Company for aromatic polyamide fibers. However, the fabric is impregnated with uncured epoxy resin. Therefore, the wet bond shear clips 360 can be applied to the trailing edge insert 220 and the second shell portion 302, such that the wet bond shear clips 360 will form to the shape of the interface between the insert 220 and the second shell portion 302. When the epoxy has cured, the wet bond shear clips 360 provide the strength and adhesion characteristics required to help maintain the trailing edge insert 220 in position relative to the second shell portion 302.

The preformed shear clips 354 are also made from reinforcing fabric which has been infused and formed to the desired shape. The preformed shear clips 354 are adhered to the trailing edge insert 220 and the first shell portion 301 by the use of the type of adhesive described above.

Outside corner mounting members 356, 362 are also made from reinforcing fabric of the type described. As with the wet bond shear clips 360, the fabric is impregnated with uncured epoxy resin. Therefore, the outside corner mounting member 356, 362 can be applied to the trailing edge insert 220 and the first shell portion 301 and the second shell portion 302, such that the outside corner mounting member 356, 362 will form to the shape of the interface between the trailing edge insert 220 and the first shell portion 301 or the trailing edge insert 220 and the second shell portion 302. When the epoxy has cured, the outside corner mounting members 356, 362 provide the strength and adhesion characteristics required to help maintain the trailing edge insert 220 in position relative to the first and second shell portions 301, 302.

Due to the complex shape of the trailing edge insert 220 and the trailing edge 203, the space provided between the first shell portion 301 and the second shell portion 302 varies. Consequently, the use of the wet bond shear clips 360 may not be appropriate in all regions. Referring to FIG. 7, in regions in which the first shell portion 301 and the second shell portion 302 are closely spaced, the preformed shear clips 354 are formed into a generally C-shaped configuration to allow the preformed shear clips 354 to be mounted on both the second shell portion 302 and the first shell portion 301, thereby eliminating the need for the wet bond shear clips in this region.

During assembly of the embodiment shown in FIG. 2 through 7, the first shell portion 301 and second shell portion 302 are formed in the desired configuration. The first and second shear webs 303, 304 are moved into position on the second shell portion 302 and are adhesively bonded thereto using known techniques. The trailing edge insert 220 is brought into engagement with the trailing edge 203 of the second shell portion 302 and mounted thereon. A first sidewall 254 of the trailing edge insert 220 is coated with adhesive and placed on the second shell portion 302 to form the adhesive joint 358. The shape of the first sidewall 254 is configured to mirror the shape of the trailing edge of the second shell portion 302 at the transition between the root 209 and the airfoil portion 205. With the trailing edge insert 220 positioned on the second shell portion 302, the wet bond shear clips 360 are positioned periodically about the length of trailing edge insert 220. The wet bond shear clips 360 engage an inside surface 256 of the trailing edge insert 220 and second shell portion 302. The wet bond shear clips 360 are placed such that the wet bond shear clips 360 conform to the angle provided between the trailing edge insert 220 and the second shell portion 302. Consequently, as the wet bond shear clips 360 dry, the wet bond shear clips 360 will provide a strong and stable mechanical connection between the trailing edge insert 220 and the second shell portion 302. In regions where space dictates, the wet bond shear clips 360 are replaced with preformed shear clips 354 positioned proximate second sidewall 258. The preformed shear clips 354 are adhered to the inside surface 256 and to the second shell portion 302 using the type of adhesives previously described.

With the first shear web 303, the second shear web 304 and the trailing edge insert 220 secured to the second shell portion 302, the first shell portion 301 is assembled thereto. Prior to assembly of the first shell portion 301, the preformed shear clips 354 are positioned along the inside surface 256 of the trailing edge insert 220. The preformed shear clips 354 may be spaced periodically or continuously along the trailing edge. The preformed shear clips 354 are provided proximate second sidewall 258. The preformed shear clips 354 are adhered to the inside surface 256 using the type of adhesives previously described. With the preformed shear clips 354 properly positioned on the trailing edge insert 220, adhesive is applied to the adhesive joint 306 (FIG. 5), the first shear web 303, the second shear web 304, the preformed shear clips 354 and the second sidewall 258. The first shell portion 301 is then moved into position such that the first shell portion 301 is adhesively bonded to the components.

With the first shell portion 301, the second shell portion 302 and the trailing edge insert 220 maintained in relative position with respect to each other, the outside corner mounting members 356, 362 are applied over the corners where the first shell portion 301 abuts the trailing edge insert 220 and the second shell portion 302 abuts the trailing edge insert 220. The outside corner mounting members are applied to the outside skin of the first and second shell portions and the outside surface 260 of the trailing edge insert 220. As previously described, the outside corner mounting members 356, 362 will form to the desired shape and provide additional strength and stability to the trailing edge insert 220 and to the blade 108. The outside corner mounting members 356, 362 may have several layers to provide for increased strength and stability. Additionally, proximate the ends of the trailing edge insert 220, where the space between the first sidewall 254 and the second sidewall 258 is small, the outside corner mounting members 356, 362 may be integrally formed with each other.

The above description describes one method of assembly. Other methods and sequences may be used without departing from the scope of the invention. As an example, the separate manufacture of the trailing edge insert 220, the preformed shear clips 354 and the wet bond shear clips 360 adds to the complexity and time required to assemble the wind turbine blade 108. It may therefore be beneficial to provide a trailing edge insert which has mounting members integrally formed thereon to replace the preformed clips 354 and the wet bond shear clips 360. In such an embodiment, the fiber fabric 252 is placed in the mold to form an outside C-shaped configuration. The fiber fabric 252 may be placed in the mold in layers to form the outside C-shape. The stiffening core 250 is then positioned inside the outside C-shape and additional fiber fabric 252 is placed inside the outside C-shape, thereby covering the stiffening core 250 and forming an inside C-shape. The fiber fabric 252 may be placed in the mold in layers to form the inside C-shape. In one embodiment, the stiffening core 250 is disposed intermediate layers of fiber fabric reinforced with matrix material. Suitable matrix materials include thermosetting or thermoplastic polymer matrix.

The components of the outside C-shape fiber fabric, the stiffening core and the inside C-shape fiber fabric are formed using any suitable composite forming method, into a unitary composite trailing edge insert 220 with integral mounting members extending therefrom to cooperate with the first and second shell portions 301, 302. Suitable methods include, but are not limited to, resin transfer molding (RTM), vacuum assisted resin transfer molding (VARTM), resin infusion method (RIM) or any other suitable resin infusion method for forming fiber reinforced composites. This unitary trailing edge insert 220 eliminates the need for separate preformed shear clips 354 and wet bond shear clips 360, thereby reducing the cost and complexity of assembling the trailing edge insert 220 to the first and second shell portions 301, 302.

The assembly of the blades 108 using the unitary trailing edge insert 220 is similar to that described above. However, the unitary trailing edge insert 220 is adhered to the second shell portion 302 by use of adhesive applied to the first sidewall 254 and the integral mounting member extending from the first sidewall 254. No wet bond shear clips 360 are used. In addition, the unitary trailing edge insert 220 is adhered to the first shell portion 301 by use of adhesive applied to the second sidewall 258 and the integral mounting member extending from the second sidewall 254. No preformed clips 354 are used. This simplifies the assembly process as less parts are used and reduces the cycle time to produce the wind turbine blade 108 as the curing time associated with various components is reduced or eliminated during the assembly of the wind turbine blade 108. The manufacture of the unitary trailing edge insert 220 can be done in a separate process, prior to the assembly of the wind turbine blade 108, thereby reducing the assembly time for the wind turbine blade 108.

Figure 8:
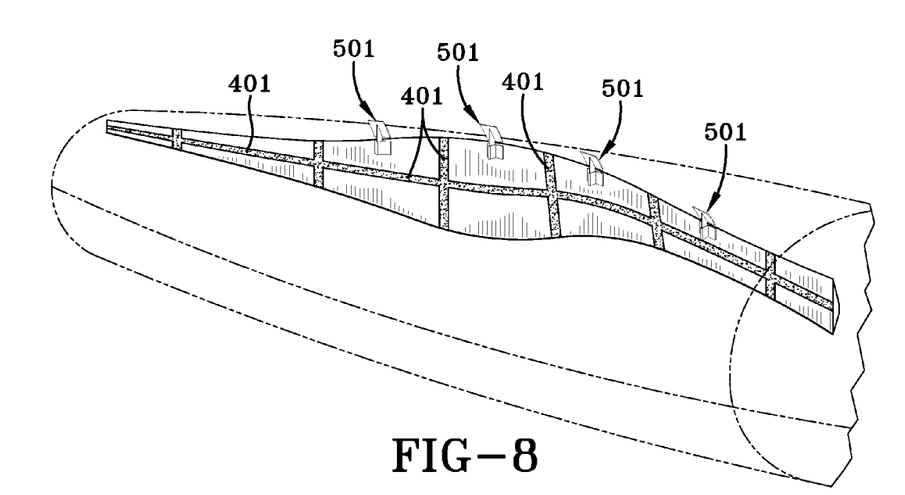
FIG. 8 is a perspective view of an alternate embodiment of the trailing edge insert, showing ribs and securing members.

Referring to FIG. 8, ribs 401 may be provided on the inside surface 256 of the trailing edge insert 220. The ribs 401 may extend along the length and/or the width of the trailing edge insert 220. The ribs 401 provide additional reinforcement and support to the trailing edge insert 220. Ribs 401 can be used to control buckling and allow the size of the stiffening core to be reduced.

Alignment members (not shown) may be provided on the first shell portion 301 and the second shell portion 302. The alignment members may be pins or any other device which cooperates with the trailing edge insert 220 to properly align the trailing edge insert 220 with the first and second shell portions 301, 302.

Openings (not shown) which extend through the skin of the first or second shell portions 301, 302 or the trailing edge insert 220 may be spaced periodically to allow for adhesive to be injected. The openings would be covered, for example, by the outside corner mounting members 356, 362, or filled during the assembly process, such that the aerodynamics of the blade 108 would not be adversely impacted by the openings.

Figure 9:
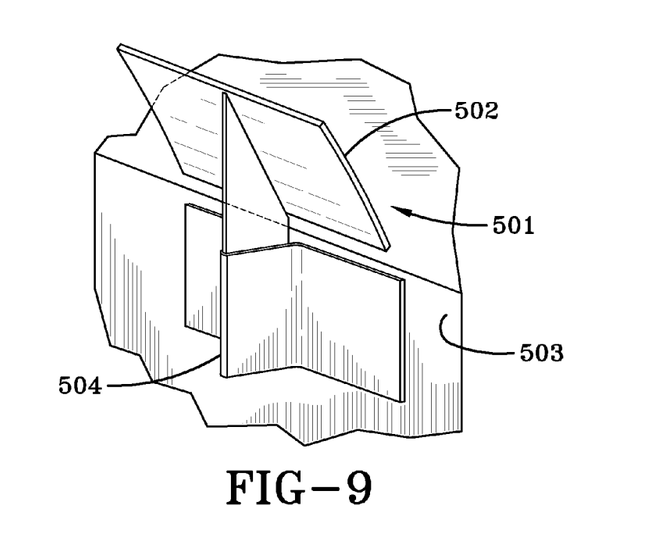
FIG. 9 is an enlarged perspective view of a gusset of FIG. 8.

Referring to FIGS. 8 and 9, securing members or gussets 501 may be used to provide strength and stability for loads which are present and out of the plane of the trailing edge insert 220. These out-of-plane loads could cause the connection between the trailing edge insert 220 and the first and second shell portions 301, 302 to fail. Each gusset 501 has a biax insert 502 which is laminated to the inner surface of either the first or second shell portion 301, 302, and a biax receptacle 503 which is laminated to the inside surface 256 of the trailing edge insert 220. Bonded shear connectors 504 are provided to connect the inserts 502 and the receptacles 503. Bond paste fill ports (not shown) may extend periodically through the trailing edge insert 220 to allow the appropriate amount of bond paste to be inserted into the connectors 504. Tensile loads are carried through the gussets, which provide significantly increased strength compared to the preformed shear clips 354, wet bond shear clips 360 and unitary trailing edge insert 220 previously described.

The use of the trailing edge insert to provide a flatback profile has many advantages, including, but not limited to, significant improvement in the aerodynamic performance of thick airfoils (t/c>30%) and increased energy capture in the root design region. The utilization of the trailing edge insert also adds structural stiffness to the blade. The use of the trailing edge insert allows the second or auxiliary shear web to be removed from the design of the blade, thereby reducing the weight of the blade. The use of the trailing edge insert to create the flatback profile provides a high lift aerodynamic design that allows for greater blade efficiency by utilizing short chord lengths and thick chord profiles. As blade performance requirements are driven higher, this design offers increased performance, particularly near the root region, in a lower weight package.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A blade for use with a wind turbine, the blade comprising:
    a leading edge and a trailing edge;
    a first shell portion which extends from the leading edge to the trailing edge and a second shell portion which extends from the leading edge to the trailing edge;
    a root portion which is positioned proximate the wind turbine and a tip portion which extends from the root portion away from the wind turbine;
    a stiffening core extending between the first shell portion and the second shell portion proximate the trailing edge and proximate the root portion, the stiffening core having ribs on an inside surface which provide reinforcement and control buckling of the stiffening core, the stiffening core being formed to provide structural stiffness to the blade, the stiffening core having a surface which creates a flatback profile;
    whereby the stiffening core provides a high lift profile for increased blade efficiency.

2. The blade as recited in claim 1, wherein intermediate layers of fiber fabric are attached to the stiffening core to form a trailing edge insert.

3. The blade as recited in claim 2, wherein the trailing edge insert is mounted to the second shell portion by an adhesive joint, a wet bond shear clip and an outside corner mounting member.

4. The blade as recited in claim 3, wherein the shear clip is a separate preformed clip which is mounted on the trailing edge insert.

5. The blade as recited in claim 3, wherein the wet bond shear clips and the outside corner mounting members are made from reinforcing fabric.

6. The blade as recited in claim 4, wherein the preformed shear clips are made from reinforcing fabric which has been infused and formed to the desired shape.

7. The blade as recited in claim 2, wherein the trailing edge insert is mounted to the first shell portion by an adhesive joint, a shear clip and an outside corner mounting member.

8. The blade as recited in claim 1, wherein the shape of the stiffening core is similar to the shape of the trailing edge of the blade.

9. The blade as recited in claim 1, wherein securing members have inserts which are laminated to the first shell portion and receptacles which are laminated to an inside surface of the stiffening core, a connector connects the stiffening core with the receptacle, the securing members provide stability for loads which are out of the plane of the insert.

10. A blade for use in the generation of power, the blade comprising:
   a leading edge and a trailing edge;
   a first shell portion which extends from the leading edge to the trailing edge;
   a second shell portion which extends from the leading edge to the trailing edge;
   an insert having layers of fiber fabric attached to a stiffening core, the insert having a flatback profile is positioned between the first shell portion and the second shell portion proximate the trailing edge of the blade, an outside surface of the insert extends between and separates the first shell portion from the second shell portion at the trailing edge, the insert being formed to provide structural stiffness to the blade;
   a shear clip extending from the insert and mounted to the first shell portion, the shear clip made from reinforcing fabric;
   whereby the insert provides structural stability to the trailing edge and a high lift profile for increased blade efficiency.

11. The blade as recited in claim 10, wherein the insert is mounted to the second shell portion by an adhesive joint, a wet bond shear clip and an outside corner mounting member.

12. The blade as recited in claim 11, wherein the wet bond shear clips and the outside corner mounting members are made from reinforcing fabric.

13. The blade as recited in claim 10, wherein the insert is mounted to the first shell portion by an adhesive joint, the shear clip and an outside corner mounting member.

14. The blade as recited in claim 13, wherein the shear clip is a separate preformed clip which has been infused and formed to the desired shape and which is mounted on the insert.

15. The blade as recited in claim 10, wherein ribs are provided on an inside surface of the insert to provide additional reinforcement and control buckling.

16. The blade as recited in claim 10, wherein securing members have inserts which are laminated to the first shell portion and receptacles which are laminated to an inside surface of the insert, a connector connects the insert with the receptacle, the securing members provide stability for loads which are out of the plane of the insert.

17. A method of manufacturing a blade for use in the generation of power, the blade having a first shell portion and a second shell portion, the method comprising:
   fixing an insert having a stiffening core disposed between layers of fiber fabric to a trailing edge of the second shell portion to provide structural stiffness to the blade, the insert having ribs provided on an inside surface to provide reinforcement and control buckling;
   applying a first clip to an inside surface of the insert proximate the second shell portion and to the second shell portion;
   applying a second clip to the inside surface of the insert;
   fixing a trailing edge of the insert and to the second clip;
   whereby the insert and the first and second clips provide structural stability to the trailing edge of the first shell portion and the second shell portion.

18. The method as recited in claim 17, wherein corner mounting members are fixed over the first shell portion and the insert where the first shell portion abuts an outside surface of the insert and over the second shell portion and the insert where the second shall portion abuts the outside surface of the insert.

* * * * *